R. L. DODGE.
DIFFERENTIAL GEAR.
APPLICATION FILED SEPT. 24, 1919.
1,431,572.  Patented Oct. 10, 1922.
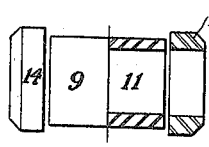 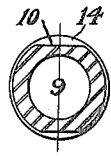 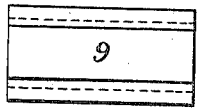 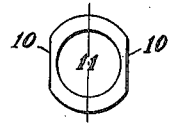
Fig. 4   Fig. 5   Fig. 2   Fig. 3
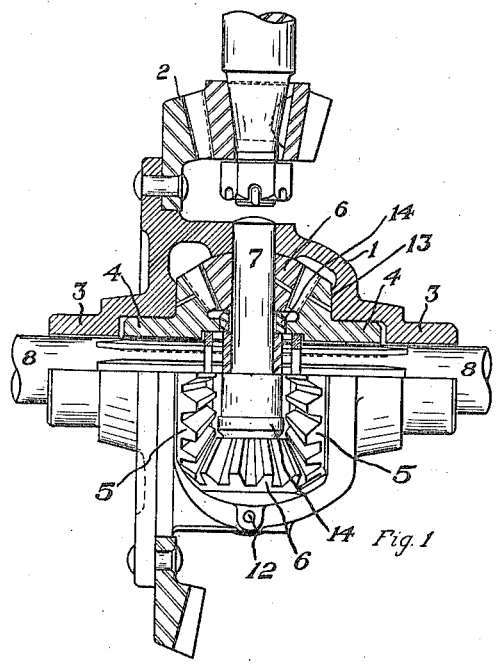
Fig. 1
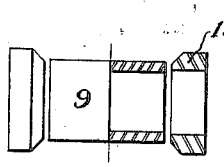 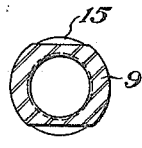 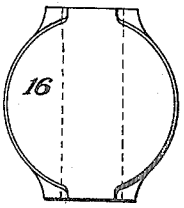 
Fig. 6   Fig. 7   Fig. 8   Fig. 9
WITNESS:
Harry T. Walters
Ralph Munden
INVENTOR.
Ralph L. Dodge
BY Raymond H. Van Nest
ATTORNEY.

Patented Oct. 10, 1922.

1,431,572

UNITED STATES PATENT OFFICE.

RALPH L. DODGE, OF SYRACUSE, NEW YORK, ASSIGNOR, BY MESNE ASSIGNMENTS, TO WILLYS CORPORATION, OF ELIZABETH, NEW JERSEY, A CORPORATION OF DELAWARE.

DIFFERENTIAL GEAR.

Application filed September 24, 1919. Serial No. 325,894.

*To all whom it may concern:*

Be it known that I, RALPH L. DODGE, a citizen of the United States, residing at Syracuse, in the county of Onondaga and State of New York, have invented new and useful Improvements in Differential Gears, of which the following is a specification.

The present invention relates to differential gearing of the type employed in the drive axle construction of motor vehicles.

More particularly the invention relates to the type of differential in which there are a plurality of pinions meshing with gears on the axle shafts, the gears and pinions being mounted in an integral or one piece frame or housing. The specific embodiment illustrated herein is that type commonly known as two pinion differentials, in which the gears on the two aligned axles mesh with two diametrically arranged pinions. In differentials of this type, an important problem is presented by the end thrust of the axles. In some forms, this end thrust is transmitted from one axle through its gear to the pinions and thence to the opposite gear of the other axle. This arrangement results in undue friction and wear between the gear and pinion teeth which may, on occasion, become so great as to interfere with the proper functioning of the differential. Another arrangement has provided spacers between the gear faces so that the teeth are relieved from undue friction, but with the result that the thrust is taken between the back of an axle gear and the frame or casing. This arrangement causes undue friction at this point and an abnormal wear which may soon produce looseness and uneven operation of the gears.

An object of the present invention is to provide a differential in which the end thrust of the axles is taken through the casing itself, thereby avoiding undue friction between the gears and pinions and undue wear between the gears and casing.

A further object is to provide a two pinion differential which may be assembled with facility.

An embodiment of the present invention is illustrated in the accompanying drawings, in which—

Fig. 1 is a longitudinal section through the differential and casing.

Figs. 2 and 3 are respectively an elevation and end view of a spacer.

Figs. 4 and 5 are respectively longitudinal and cross-sectional views of the spacer illustrated in the assembly of Fig. 1.

Figs. 6 and 7 are respectively longitudinal and sectional views of a modified form of spacer.

Figs. 8 and 9 are respectively side and end elevations of another form of spacer.

In the embodiment of the invention illustrated there is a frame or casing 1 which houses the gears and pinions and to which the ring gear 2 is attached. The casing is provided with opposite hub portions 3, forming bearings for the hubs 4 of the axle gears 5. The pinions 6 are aranged diametrically opposite each other in mesh with the axle gears 5. A pin 7 passes through the casing transversely and supports the pinions 6, which are journalled thereon.

The axle shafts 8 will pass through the hub portions 3 of the casing into engagement with the gears 5 to which they may be secured by nuts, if desired.

Figs. 2 and 3 illustrate one form of spacer which may be employed to relieve the gears and pinions of the end thrust from the axle shafts. This spacer is in the form of a short tube 9, flattened on two opposite faces as at 10. The bore 11 of the spacer is just sufficient to receive the pin 7 with a close fit. The gears, pinions and spacer may be assembled within the casing by placing the gears 5 within the casing, connecting the axle shafts 8 therewith, and then rolling the pinions 6 into position for engagement by the pin 7. The pin 7 is then inserted through one side of the casing, one pinion 6, the spacer 9, the other pinion 6 and the other side of the casing, wherein it is secured by means of the cross pin 12. The outside diameter of the spacer is such that the ends of the axle shafts bear directly thereagainst. In operation, therefore, any end thrust from one axle shaft is transmitted directly to the spacer 9 and through the pin 7, to the casing 1, the thrust being ultimately taken by an end thrust bearing on the hub of the casing. By means of this improved arrangement, the gears and pinions are relieved from all end thrust, thus avoiding friction between the teeth and crowding of the gears. Also, there is no undue friction between the rear faces 13 of the gears and the adjacent portion of the casing, as is the case where the thrust is taken through the gears and an interposed spacer between the gears.

If desired, a gear spacer in the form of a roller 14 may be employed in addition to the spacer 9 to hold the gears 5 in proper spaced relation. This gear spacer is shown in position at each end of the spacer 9 and carried by pin 7 in Fig. 1, and is illustrated in enlarged detail in Figs. 4 and 5. Where this form of spacer is employed, any end thrust which may be transmitted to a gear 5, due to any tendency of this gear to stick on the spline of its shaft 8, will in turn be transmitted to pin 7 and thence to the casing 1, thus avoiding a transmission of thrust through the opposite gear 5 to the casing at the surface 13.

Figs. 6 and 7 illustrate a spacer and gear spacer similar in construction and arrangement to that illustrated in Figs. 4 and 5, with a slightly modified form of gear spacer 15 to accommodate a different relation of gears and pinions in the differential.

Figs. 8 and 9 illustrate a still further modification of the spacer in which the tube 9 is replaced by an enlarged disc 16, extending sufficiently beyond the periphery of the shaft to act as a gear spacer as well. The disc 16 is provided with a bore to receive the pin 7, as in the other forms.

It is apparent that this improved construction provides a differential in which the end thrust of the axle shafts is taken directly from the shafts through the casing without transmittal through the gears or from one axle gear to the casing, thus preventing undue friction, crowding of gears or wear of parts which would interfere with the efficient operation and proper functioning of the differential. It is obvious that the principles of the invention as herein illustrated and as claimed in the appended claims, are susceptible of application to other types of differential without departing from the scope and intent of the invention.

What I claim as new and desire to secure by Letters Patent of the United States, is—

1. In a differential, a pair of axially aligned shafts, a gear on each shaft, pinions forming a geared connection between said gears, means for taking an end thrust from either shaft independently of said gears and pinions and additional means for holding said gears in proper spaced relation.

2. In a differential, a pair of axially aligned shafts, a gear on each shaft, a pair of diametrically opposite pinions meshing with both gears, a frame surrounding said gears and pinions, a pin between the ends of said shafts, said pin being directly supported in said frame, means on said pin forming an end thrust bearing for said shafts whereby an end thrust from either shaft is directly transmitted to said frame independently of said gears and pinions and additional means for holding said gears in proper spaced relationship.

3. In a differential, a pair of axially aligned shafts, a gear on each shaft, pinions forming a geared connection between said gears, a pinion shaft between said gears, means fixed to the pinion shaft for taking an end thrust from either aligned shaft independently of said gears and pinions and additional means freely rotatable about said pinion shaft for holding said gears in proper spaced relationship.

In witness whereof, I have hereunto subscribed my name.

RALPH L. DODGE.